(12) United States Patent
Jeong et al.

(10) Patent No.: US 9,410,268 B2
(45) Date of Patent: Aug. 9, 2016

(54) METHOD FOR PREPARING CARBON NANOTUBE FIBERS WITH IMPROVED SPINNING PROPERTIES USING SURFACTANT

(71) Applicant: Soongsil University Research Consortium Techno-Park, Seoul (KR)

(72) Inventors: Young Jin Jeong, Seoul (KR); Jun Young Song, Anyang-si (KR); So Young Kim, Seoul (KR); So Ra Yoon, Gunpo-si (KR); Yeon Su Jung, Incheon (KR)

(73) Assignee: Soongsil University Research Consortium Techno-Park, Seoul (KR)

( * ) Notice: Subject to any disclaimer, the term of this patent is extended or adjusted under 35 U.S.C. 154(b) by 0 days.

(21) Appl. No.: 14/372,212

(22) PCT Filed: Dec. 26, 2012

(86) PCT No.: PCT/KR2012/011421
§ 371 (c)(1),
(2) Date: Jul. 14, 2014

(87) PCT Pub. No.: WO2014/088147
PCT Pub. Date: Jun. 12, 2014

(65) Prior Publication Data
US 2015/0110704 A1    Apr. 23, 2015

(30) Foreign Application Priority Data
Dec. 4, 2012 (KR) .................. 10-2012-0139782

(51) Int. Cl.
*C01B 31/02* (2006.01)
*D01F 9/12* (2006.01)
*D01D 5/06* (2006.01)
*B82Y 40/00* (2011.01)

(52) U.S. Cl.
CPC .............. *D01F 9/12* (2013.01); *C01B 31/0226* (2013.01); *C01B 31/0246* (2013.01); *C01B 31/0253* (2013.01); *D01D 5/06* (2013.01); *B82Y 40/00* (2013.01); *Y02P 20/544* (2015.11)

(58) Field of Classification Search
CPC .... C01B 31/0246; C01B 31/0253; C01F 9/12
See application file for complete search history.

(56) References Cited

U.S. PATENT DOCUMENTS

2008/0170982 A1* 7/2008 Zhang et al. ............... 423/447.3

FOREIGN PATENT DOCUMENTS

JP      2010065339 A * 3/2010
KR  1020030008763 A    1/2003

(Continued)

OTHER PUBLICATIONS

Zhong, Xiao-Hua, et al. "Continuous multilayered carbon nanotube yarns." Advanced materials 22.6 (2010): 692-696.*

(Continued)

*Primary Examiner* — Richard M Rump
(74) *Attorney, Agent, or Firm* — DLA Piper LLP (US)

(57) ABSTRACT

The present invention provides a method for preparing carbon nanotube fibers with improved spinning properties using a surfactant and carbon nanotube fibers prepared by the method. According to the method for preparing carbon nanotube fibers of the present invention, the addition of a surfactant during the preparation of carbon nanotubes interrupts and delays the agglomeration of catalyst particles, which reduces the size of the catalyst particles and uniformly disperses the catalyst particles that play a key role in the formation of carbon nanotube fibers, thus increasing the strength and conductivity of carbon nanotube fibers and improving the spinning properties. While convention methods prepare carbon nanotube fibers by injecting a catalytic material for the synthesis of carbon nanotubes in a high-pressure supercritical state to be uniformly dispersed, the present invention uses a dispersant and thus does not require the injection in a high-pressure supercritical state.

11 Claims, 4 Drawing Sheets

(56) References Cited

FOREIGN PATENT DOCUMENTS

| KR | 1020120090383 A | 8/2012 |
| WO | WO 2012108607 A1 * | 8/2012 |

OTHER PUBLICATIONS

Machine English translation of JP2010-065339.*
Li, Ya-Li, Ian A. Kinloch, and Alan H. Windle. "Direct spinning of carbon nanotube fibers from chemical vapor deposition synthesis." Science 304.5668 (2004): 276-278.*
English WO2012108607A1.*
Human translation of KR2012-108607A1.*
Sundaram, Rajyashree M., Krzysztof KK Koziol, and Alan H. Windle. "Continuous direct spinning of fibers of single-walled carbon nanotubes with metallic chirality." Advanced Materials 23.43 (2011): 5064-5068.*
Geng et al., "Effects of Surfactant Treatment on Mechanical and Electrical Properties of CNT/Epoxy Nanocomposites," *Composites Part A* (2008), 39:1876-1883, Elsevier Ltd.
Vaisman et al., "The Role of Surfactants in Dispersion of Carbon Nanotubes," *Adv. Colloid Interface Sci.* (2006), 128-130:37-46, Elsevier B.V.

* cited by examiner

METHOD FOR PREPARING CARBON NANOTUBE FIBERS WITH IMPROVED SPINNING PROPERTIES USING SURFACTANT

CROSS-REFERENCE TO RELATED APPLICATIONS

This application is a 35 USC §371 National Stage application of International Application No. PCT/KR2012/011421 filed Dec. 26, 2012, now pending; which claims the benefit under 35 USC §119(a) to Korea Application Serial No. 10-2012-0139782 filed Dec. 4, 2012. The disclosure of each of the prior applications is considered part of and is incorporated by reference in the disclosure of this application.

TECHNICAL FIELD

The present invention relates to a method for preparing carbon nanotube fibers with improved spinning properties using a surfactant and carbon nanotube fibers prepared by the method.

BACKGROUND ART

Carbon nanotubes have been most actively studied for the recent decade due to their various potential applications. Carbon nanotubes have excellent electric/electronic properties, low thermal expansion, high thermal conductivity, very high mechanical strength, etc. and thus have their applicability to various fields. As an example, carbon nanotubes show their applicability to electric/electronic devices, such as devices that can substitute for silicon semiconductors, field-emission display devices, electrodes, super-capacitors, etc., high-performance/high-strength polymers or ceramic nanocomposites, and applications such as hydrogen storage media, gas sensors, nanocarriers, etc. due to excellent gas absorption.

Reviewing existing methods for preparing carbon nanotubes, a solution for the synthesis of carbon nanotube fibers generally comprises a carbon source such as acetone, a catalyst precursor such as ferrocene, and an activator such as thiophene and is sprayed into a vertical electric furnace to synthesize carbon nanotube fibers. At this time, the catalyst precursor is decomposed in the vertical electric furnace to produce catalyst particles, and these particles tend to agglomerate. The agglomeration of the catalyst particles affects the physical properties such as the diameter of carbon nanotubes, and the catalyst particles that are larger than a predetermined level lose their catalytic function, which do not participate in the synthesis of carbon nanotube fibers but are present as impurities, thus adversely affecting the strength and electrical properties of carbon nanotube fibers. Therefore, there is a need to develop an effective method for preparing carbon nanotube fibers.

DISCLOSURE

Technical Problem

The present inventors have studied on a method for improving the physical properties of carbon nanotubes and found that when a surfactant is added during the preparation of carbon nanotubes, the strength and conductivity of carbon nanotube fibers are improved and the spinning properties of carbon nanotube fibers are also improved, thus completing the present invention.

Accordingly, an object of the present invention is to provide a method for preparing carbon nanotube fibers with improved spinning properties using a surfactant.

Another object of the present invention is to provide carbon nanotube fibers prepared by the method.

Technical Solution

The present invention provides a method for preparing carbon nanotube fibers with improved spinning properties using a surfactant.

Moreover, the present invention provides carbon nanotube fibers prepared by the method.

Advantageous Effects

According to the method for preparing carbon nanotube fibers of the present invention, the addition of a surfactant during the preparation of carbon nanotubes interrupts and delays the agglomeration of catalyst particles, which reduces the size of the catalyst particles and uniformly disperses the catalyst particles that play a key role in the formation of carbon nanotube fibers, thus increasing the strength and conductivity of carbon nanotube fibers and improving the spinning properties. While convention methods prepare carbon nanotube fibers by injecting a catalytic material for the synthesis of carbon nanotubes in a high-pressure supercritical state to be uniformly dispersed, the present invention uses a dispersant and thus does not require the injection in a high-pressure supercritical state.

BEST MODE FOR CARRYING OUT THE INVENTION

Figure 1:
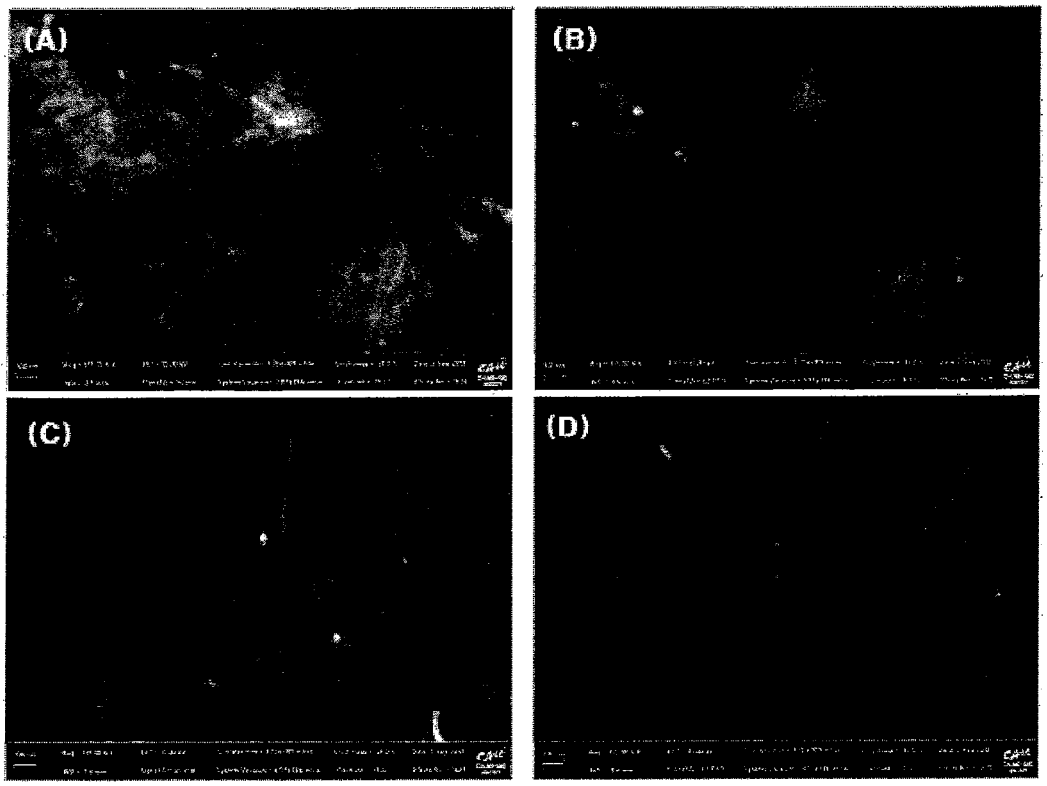
FIG. 1 shows scanning electron microscopy (SEM) images and backscattered electron diffraction (BSED) images of pure carbon nanotubes and carbon nanotubes mixed with 1 wt % polysorbate 20 as a nonionic surfactant (A: SEM image of pure carbon nanotubes; B: BSED image of pure carbon nanotubes; C: SEM image of carbon nanotubes mixed with polysorbate 20, and D: BSED image of carbon nanotubes mixed with polysorbate 20).

The present provides a method for preparing carbon nanotube fibers with improved spinning properties using a surfactant, the method comprising the steps of:

(1) preparing a mixed solution by mixing a carbon source solution, a catalyst, a promoter, and a surfactant;

(2) forming a carbon nanotube agglomerate by injecting the mixed solution into an electric furnace at 500 to 1,500° C. together with a carrier gas; and (3) preparing carbon nanotube fibers by passing the carbon nanotube agglomerate through water to allow carbon nanotubes to be spun into fibers.

Moreover, the present invention provides carbon nanotube fibers with improved spinning properties prepared by the method.

In the following, the preparation method of carbon nanotubes will be described in detail step by step.

Step (1) is to prepare a mixed solution for the preparation of carbon nanotube fibers, in which the mixed solution is prepared by adding 0.01-20.00 wt % catalyst, 0.01-20.00 wt % promoter, and 0.01-20.00 wt % surfactant with respect to the total weight of the mixed solution to the balance of a carbon source solution.

The carbon source solution may comprise at least one selected from the group consisting of formaldehyde ($CH_2O$), acetaldehyde ($C_2H_4O$), methanol ($CH_3OH$)), ethanol ($C_2H_5OH$), diethylether (($C_2H_5)_2O$), polyethylene glycol (($CH_2$—$CH_2$—$O)_9$), 1-propanol ($CH_3CH_2CH_2OH$), acetone ($CH_3OCH_3$), ethyl formate ($CH_3CH_2COOH$), benzene ($C_6H_6$), mesitylene ($C_6H_3(CH_3)_3$), toluene ($C_7H_8$), xylene ($C_6H_4$ $(CH_3)_2$), cumene ($C_9H_{12}$), ethylbenzene ($C_8H_{10}$), naphthalene ($C_{10}H_8$), methane ($CH_4$), ethane ($C_2H_6$), propane ($C_3H_8$), butane ($C_4H_{10}$), pentane ($C_5H_{12}$), hexane ($C_6H_{14}$), cyclohexane ($C_6H_{12}$); ethylene ($C_2H_4$), propylene ($C_3H_6$), and acetylene ($C_2H_2$), but not limited thereto.

The catalyst may comprise at least one selected from the group consisting of copper (Cu), chromium (Cr), molybdenum (Mo), tungsten (W), iron (Fe), cobalt (Co), nickel (Ni), ruthenium (Ru), rhodium (Rh), palladium (Pd), osmium (Os), iridium (Ir), platinum (Pt), and ferrocene, but not limited thereto.

The promoter may comprise thiophene ($C_4H_4S$) or carbon disulfide ($CS_2$), but not limited thereto.

The surfactant may comprise at least one selected from the group consisting of sodium lignosulfonate, sodium lauryl sulfate, sodium dodecyl sulfate (SDS, $NaC_{12}H_{25}SO_4$), ammonium lauryl sulfate, sodium laureth sulfate, sodium lauryl ether sulfate (SLES), sodium myreth sulfate, sodium stearate, sodium lauroyl sarcosinate, perfluorononanoate, perfluorooctanoate, octenidine dihydrochloride, cetyl trimethylammoniumbromide (CTAB), hexadecyl trimethyl ammonium bromide, cetyl trimethylammonium chloride (CTAC), cetylpyridinium chloride (CPC), benzalkonium chloride (BAC), benzethonium chloride (BZT), 5-bromo-5-nitro-1,3-dioxane, dimethyldioctadecylammonium chloride, dioctadecyldimethylammonium bromide (DODAB), polyoxyethylene glycol alkyl ethers ($CH_3(CH_2)_{10\text{-}16}(O$—$C_2H_4)_{1\text{-}25}O$), octaethylene glycol monododecyl ether, pentaethylene glycol monododecyl ether, polyoxypropylene glycol alkyl ethers ($CH_3$ $(CH_2)_{10\text{-}16}(O$—$C_3H_6)_{1\text{-}25}O$), glucoside alkyl ethers ($CH_3(CH_2)_{10\text{-}16}(O$-Glucoside$)_{13}OH$), decyl glucoside alkyl ethers, lauryl glucoside alkyl ethers, octyl glucoside alkyl ethers, polyoxyethylene glycol octylphenol ethers ($C_8H_{17}(C_6H_4)(O$—$C_2H_4)_{1\text{-}25}OH$), polyoxyethylene glycol alkylphenol ethers ($C_9H_{19}$ ($C_6H_4$) ($O$—$C_2H_4)_{1\text{-}25}OH$), polyoxyethylene glycol nonoxynol-9 ethers, glycerol alkyl esters, glyceryl laurate esters, polyoxyethylene glycol sorbitan alkyl esters, polysorbate 20, 40, 60, 80, sorbitan alkyl esters, spans, cocamide MEA, cocamide DEA, dodecyldimethylamine oxide, block copolymers of polyethylene glycol and polypropylene glycol, poloxamers, and polyethoxylated tallow amine (POEA), but not limited thereto.

Step (2) is to prepare a carbon nanotube agglomerate, in which the mixed solution is injected into a high-temperature electric furnace at a rate of 1-100 ml/hour and, at the same time, a carrier gas is injected into the high-temperature electric furnace at a rate of 0.1-5 L/min. At this time, the temperature of the electric furnace is in the range of 500 to 1,500° C.

The carrier gas may comprise hydrogen, but not limited thereto.

Step (3) is to allow carbon nanotubes to be spun into fibers, in which the carbon nanotube fibers are prepared by passing the carbon nanotube agglomerate through water to allow carbon nanotubes to be spun into fibers.

The preparation method of the present invention may further comprise the step of allowing the carbon nanotube fibers to be twisted.

Moreover, the preparation method of the present invention may further comprise, after step (3), the step of densifying the carbon nanotube fibers by immersing the carbon nanotube fibers in an organic solvent and drying the resulting carbon nanotube fibers.

The organic solvent may comprise at least one selected from the group consisting of dimethyl sulfoxide, acetone, ethanol, chloroform, carbon dichloride, ethyl acetate, methanol, hexane, acetonitrile, toluene, benzene, carbon tetrachloride, pentane, polycaprolactone, tetrahydrofuran, and dimethyl formaldehyde, but not limited thereto.

Furthermore, the preparation method of the present invention may further comprise the step of heat-treating the densified carbon nanotube fibers.

In addition, it is possible to obtain a carbon nanotube film by changing a winding method.

According to the method for preparing carbon nanotube fibers of the present invention, the addition of a surfactant during the preparation of carbon nanotubes interrupts and delays the agglomeration of catalyst particles, which reduces the size of the catalyst particles and uniformly disperses the catalyst particles that play a key role in the formation of carbon nanotube fibers, thus increasing the strength and conductivity of carbon nanotube fibers and improving the spinning properties. While convention methods prepare carbon nanotube fibers by injecting a catalytic material for the synthesis of carbon nanotubes in a high-pressure supercritical state to be uniformly dispersed, the present invention uses a dispersant and thus does not require the injection in a high-pressure supercritical state.

[Mode for Invention]

Hereinafter, preferable Examples are provided for better understanding of the present invention. However, the following Examples are provided only for illustrative purposes, and the present invention is not limited by the Examples.

EXAMPLE 1

Preparation of Carbon Nanotube Fibers Using Carbon Nanotube Fiber Solution Containing Nonionic Surfactant (Polysorbate 20)

A mixed solution, prepared by adding 0.2 wt % ferrocene as a catalyst, 0.8 wt % thiophene as a promoter, and 1 wt % polysorbate 20 as a nonionic surfactant to the balance of acetone as a carbon source and dispersed by an ultrasonic device, and hydrogen gas were injected together into a vertical electric furnace at a rate of 10 ml/hour and 1 L/min, respectively, to synthesis carbon nanotubes fibers. At this time, the temperature of the electric furnace was 1,200° C. The synthesized carbon nanotubes fibers were passed through water at the bottom of the electric furnace to be spun into fibers and wound at a rate of 7.5 m/min.

EXAMPLE 2

Preparation of Carbon Nanotube Fibers with Improved Spinning Properties Using Nonionic Surfactant A mixed solution, prepared by adding 1.5 wt % ferrocene as a catalyst, 0.1 wt % thiophene as a promoter, and 1 wt % polysorbate 20 as a nonionic surfactant to the balance of ethanol as a carbon source and dispersed by an ultrasonic device, and hydrogen gas were injected together into a vertical electric furnace at a rate of 5 ml/hour and 1.6 L/min, respectively, to synthesis carbon nanotubes fibers. At this time, the temperature of the electric furnace was 1,250° C. The synthesized carbon nanotubes fibers were wound at the bottom of the electric furnace and passed through water at the bottom of the electric furnace to be spun into fibers. The carbon nanotube fibers were immersed in a bath of 99.8% dimethyl sulfoxide (DMSO) to be densified, dried in a 200° C. dryer, and then wound at a rate of 9 m/min.

EXAMPLE 3

Preparation of Double-Walled Carbon Nanotube Fibers with Improved Spinning Properties Using Nonionic Surfactant A mixed solution, prepared by adding 1 wt % ferrocene as a catalyst, 0.3 wt % thiophene as a promoter, and 1 wt % polysorbate 60 as a nonionic surfactant to the balance of ethanol as a carbon source and dispersed by an ultrasonic device, and hydrogen gas were injected together into a vertical electric furnace at a rate of 10 ml/hour and 1 L/min, respectively, to synthesis carbon nanotubes fibers. At this time, the temperature of the electric furnace was 1,200° C. The synthesized carbon nanotubes fibers were wound at the bottom of the electric furnace and passed through water at the bottom of the electric furnace to be spun into fibers. The carbon nanotube fibers were immersed in a bath of 99.8% dimethyl sulfoxide (DMSO) to be densified, dried in a 200° C. dryer, and then wound at a rate of 5 m/min.

EXAMPLE 4

Preparation of Carbon Nanotube Fibers Using Anionic Surfactant

A mixed solution, prepared by adding 0.2 wt % ferrocene as a catalyst, 0.8 wt % thiophene as a promoter, and 1 wt % dodecylbenzenesulfonate as an anionic surfactant to the balance of acetone as a carbon source and dispersed by an ultrasonic device, and hydrogen gas were injected together into a vertical electric furnace at a rate of 10 ml/hour and 1 L/min, respectively, to synthesis carbon nanotubes fibers. At this time, the temperature of the electric furnace was 1,250° C. The synthesized carbon nanotubes fibers were passed through water at the bottom of the electric furnace to be spun into fibers. The carbon nanotube fibers were immersed in a bath of 99.8% dimethyl sulfoxide (DMSO) to be densified, dried in a 200° C. dryer, and then wound at a rate of 5 m/min.

EXAMPLE 5

Preparation of Carbon Nanotube Fibers Using Cationic Surfactant

A mixed solution, prepared by adding 1 wt % ferrocene as a catalyst, 0.3 wt % thiophene as a promoter, and 2 wt % benzalkonium chloride as a cationic surfactant to the balance of ethanol as a carbon source and dispersed by an ultrasonic device, and hydrogen gas were injected together into a vertical electric furnace at a rate of 10 ml/hour and 1 L/min, respectively, to synthesis carbon nanotubes fibers. At this time, the temperature of the electric furnace was 1,250° C. The synthesized carbon nanotubes fibers were passed through water at the bottom of the electric furnace to be spun into fibers. The carbon nanotube fibers were immersed in a bath of 99.8% dimethyl sulfoxide (DMSO) to be densified, dried in a 200° C. dryer, and then wound at a rate of 5 m/min.

EXAMPLE 6

Preparation and Heat Treatment of Carbon Nanotube Fibers with Improved Spinning Properties Using Nonionic Surfactant A mixed solution, prepared by adding 0.2 wt % ferrocene as a catalyst, 0.8 wt % thiophene as a promoter, and 1 wt % polyoxyethylene glycol alkyl ether as a nonionic surfactant to the balance of acetone as a carbon source and dispersed by an ultrasonic device, and hydrogen gas were injected together into a vertical electric furnace at a rate of 10 ml/hour and 1 L/min, respectively, to synthesis carbon nanotubes fibers. At this time, the temperature of the electric furnace was 1,250° C. The synthesized carbon nanotubes fibers were wound at the bottom of the electric furnace. The carbon nanotube fibers were immersed in a bath of 99.8% dimethyl sulfoxide (DMSO) to be densified, dried in a 200° C. dryer, and then wound at a rate of 9 m/min. Since the carbon nanotube fibers containing a surfactant have excellent thermal stability, the carbon nanotube fibers prepared by heating at a rate of 10° C./min under a nitrogen atmosphere in a high-temperature electric furnace were heat-treated, thus obtaining high-purity carbon nanotube fibers.

EXPERIMENTAL EXAMPLE 1

Scanning Electron Microscopy and Backscattered Electron Diffraction

The scanning electron microscopy images and backscattered electron diffraction images of pure carbon nanotubes and carbon nanotubes mixed with 1 wt % polysorbate 20 as a nonionic surfactant are shown in FIG. 1 (A: SEM image of pure carbon nanotubes; B: BSED image of pure carbon nanotubes; C: SEM image of carbon nanotubes mixed with polysorbate 20, and D: BSED image of carbon nanotubes mixed with polysorbate 20).

Figure 2:
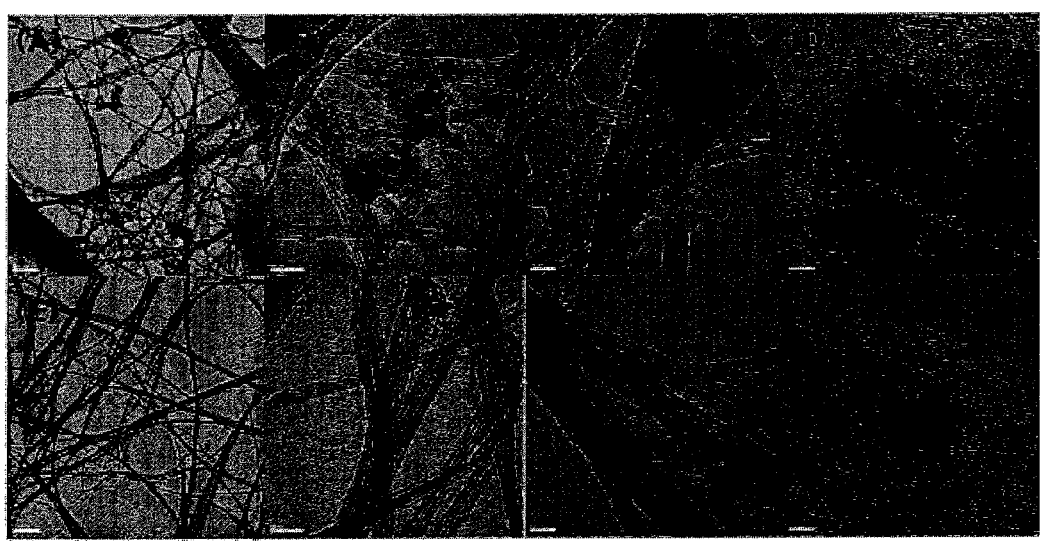
FIG. 2 shows transmission electron microscopy (TEM) images of pure carbon nanotubes and carbon nanotubes mixed with 1 wt % polysorbate 20 as a nonionic surfactant.

Moreover, the transmission electron microscopy (TEM) images of pure carbon nanotubes and carbon nanotubes mixed with 1 wt % polysorbate 20 as a nonionic surfactant are shown in FIG. 2 (A-D: pure carbon nanotubes; and E-H: carbon nanotubes mixed with polysorbate 20).

As shown in FIGS. 1 and 2, it was found that the amount of catalyst particles agglomerated was small in the carbon nanotubes mixed with the surfactant and the diameter of the synthesized carbon nanotubes became smaller. The areas shown as white are the catalyst particles, indicating that the agglomeration of the catalyst particles was reduced by the presence of the surfactant. When the decomposition of ferrocene occurs rapidly, the time during which the catalyst particles agglomerate increases, and thus the size of the catalyst particles increases. The diameter of carbon nanotubes formed on catalyst particles of large size also increases. Moreover, as the agglomeration of the catalyst particles occurs slowly, the carbon nanotubes are synthesized on catalyst particles of small size, and thus the diameter of carbon nanotubes also decreases.

Figure 3:
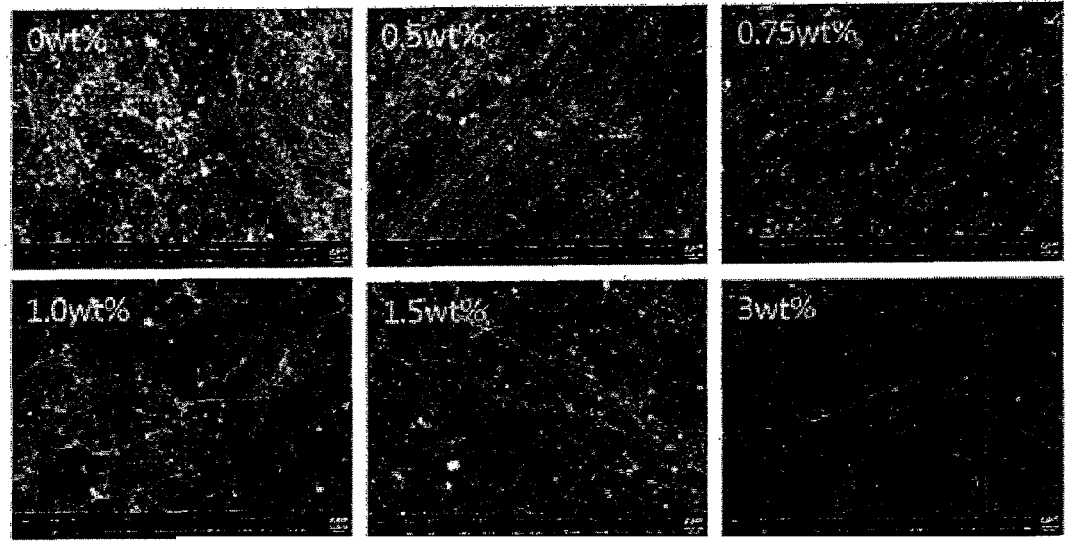
FIG. 3 shows scanning electron microscopy (SEM) images of the surface of carbon nanotube fibers with different concentrations of polysorbate 20 as a nonionic surfactant added during the preparation of carbon nanotubes.

The scanning electron microscopy (SEM) images of the surface of carbon nanotube fibers with different concentrations of polysorbate 20 as a nonionic surfactant added during the preparation of carbon nanotubes are shown in FIG. 3.

As shown in FIG. 3, it was found that as the concentration of the surfactant added increased, the amount and size of catalyst particles agglomerated decreased, and even when the Surfactant was added in an amount of 1.5 wt % or more, the dispersion of catalyst particles was very superior.

EXPERIMENTAL EXAMPLE 2

Figure 4:
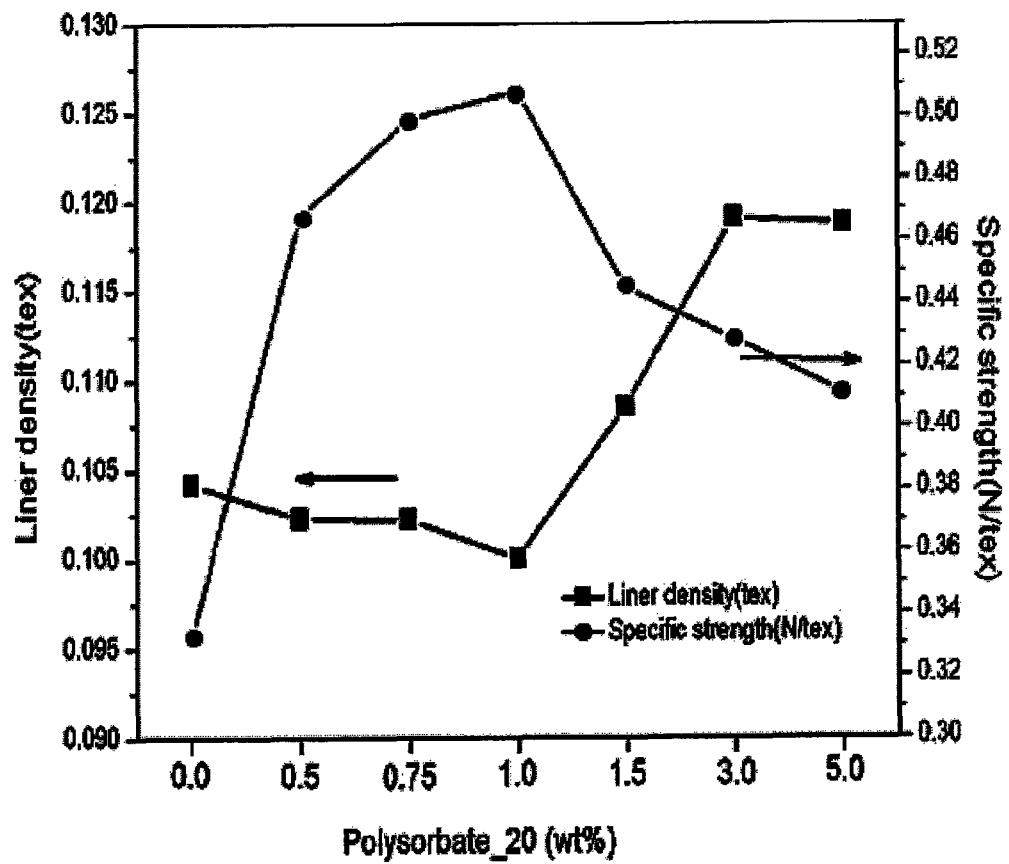
FIG. 4 is a graph showing the measured values of linear density (tex) and the specific strength (N/tex) of carbon nanotube fibers prepared with different concentrations of polysorbate 20 as a nonionic surfactant.
Figure 5:
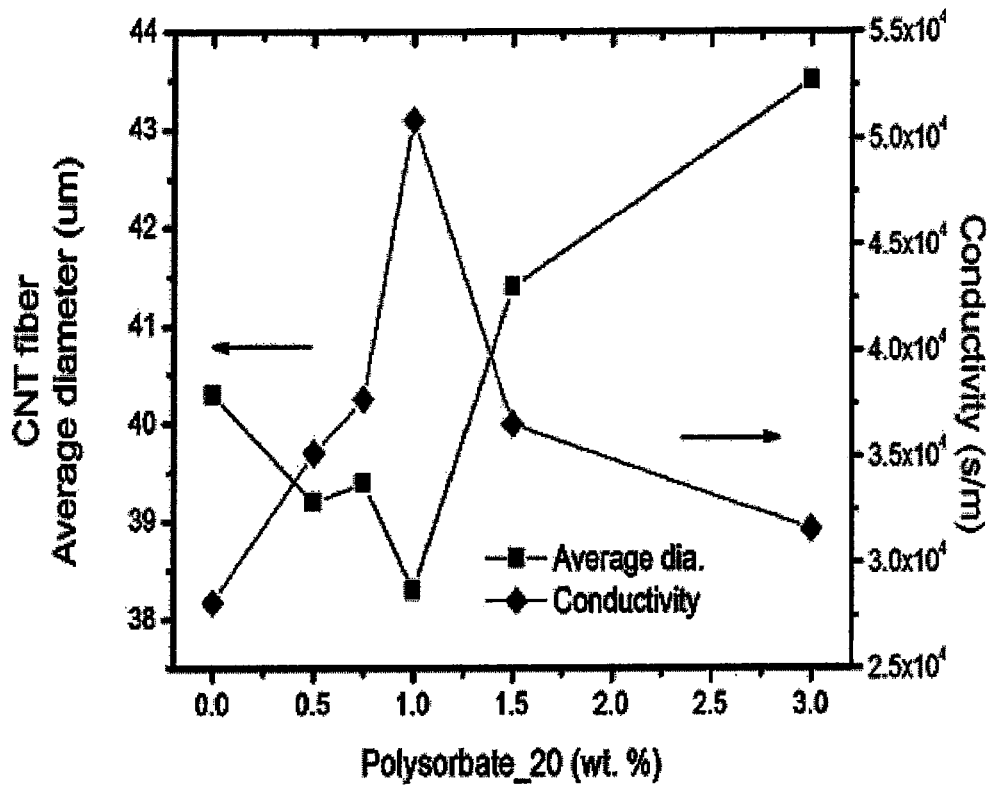
FIG. 5 is a graph showing the measured values of average diameter (um) and the conductivity (s/m) of carbon nanotube fibers prepared with different concentrations of polysorbate 20 as a nonionic surfactant.

Measurement of Linear Density (Tex), Specific Strength (N/Tex), Average Diameter (um), and Conductivity (s/m) of Carbon Nanotube Fibers Prepared with Different Concentrations of Polysorbate 20 as Nonionic Surfactant The measured values of linear density (tex), specific strength (N/tex), average diameter (um), and conductivity (s/m) of carbon nanotube fibers prepared with different concentrations of polysorbate 20 as a nonionic surfactant are shown in FIGS. 4 and 5.

As shown in FIGS. 4 and 5, it was found that the physical properties of carbon nanotube fibers varied depending on the amount of the surfactant added. As the amount of the surfactant added increased, the specific strength and conductivity of carbon nanotube fibers increased, and when the amount of the surfactant exceeded a threshold value, the physical properties of carbon nanotube fibers tended to decrease. It is believed that the reason for this is that amorphous carbon was formed by excess surfactant. The amorphous carbon can be removed by heat treatment, for example, and the threshold value of the surfactant may vary depending on the raw material composition and the process conditions and has been identified as 1 wt % in the example of the present invention.

EXPERIMENTAL EXAMPLE 3

Figure 6:
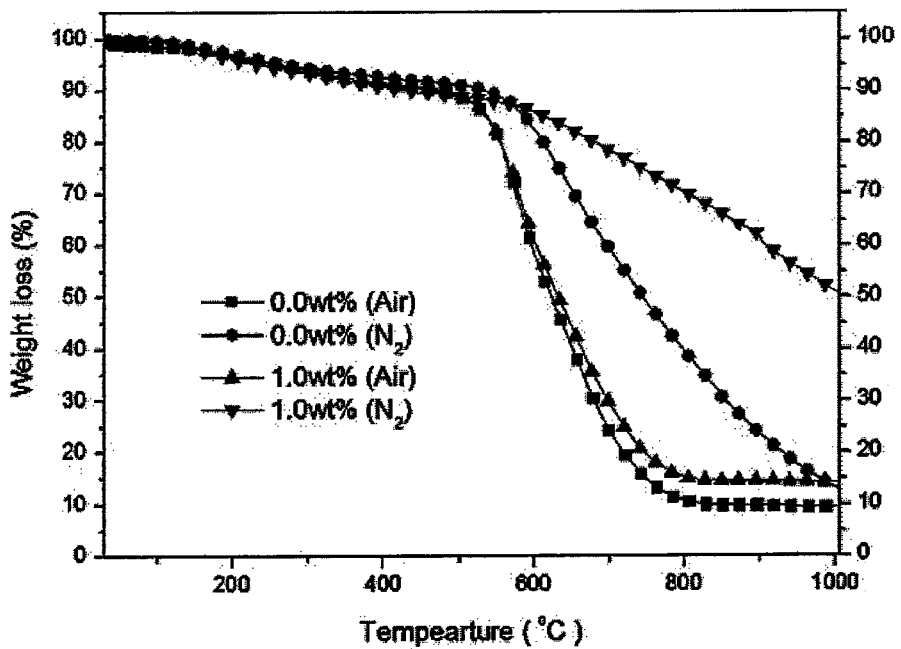
FIG. 6 is a graph showing the results of thermal gravimetric analysis (TGA) of carbon nanotube fibers prepared using 1 wt % polysorbate 20 as a nonionic surfactant.

Thermal Gravimetric Analysis (TGA) of Carbon Nanotube Fibers Prepared Using 1 Wt % Polysorbate 20 as Nonionic Surfactant The graph showing the results of thermal gravimetric analysis (TGA) of the carbon nanotube fibers prepared using 1 wt % polysorbate 20 as a nonionic surfactant is shown in FIG. 6.

As shown in FIG. 6, it was found that the carbon nanotube fibers synthesized using a nonionic surfactant have improved thermal stability. As shown in the TGA graph, it was found that the carbon nanotube fibers were not decomposed but maintained even by heat treatment at 1,000° C. It is believed that the reason for this that the carbon nanotube fibers of small diameter increased the crystallinity and densification due to the presence of the surfactant, thus improving the thermal stability. The specific strength of the carbon nanotube fibers heat-treated in a high-temperature electric furnace at 1,000° C. was increased by about 1.8 times, and it is believed that the reason for this is that the amount of impurities such as amorphous carbon formed in the fibers was small, thus reducing the linear density of carbon nanotube fibers.

EXPERIMENTAL EXAMPLE 4

Figure 7:
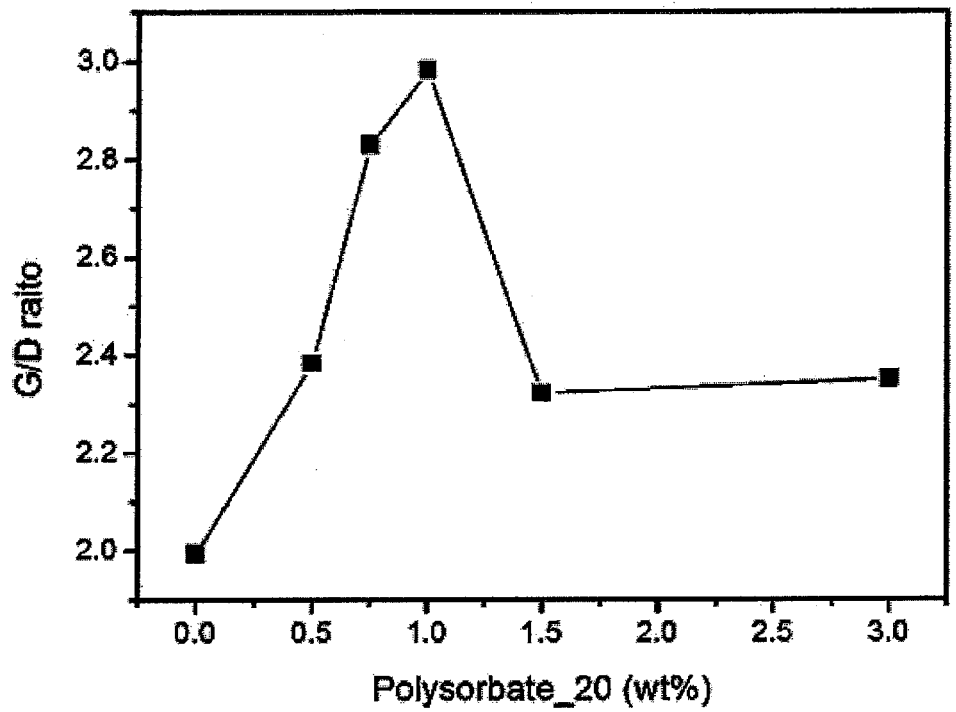
FIG. 7 is a graph showing the G/D ratio of carbon nanotube fibers prepared with different concentrations of polysorbate 20 as a nonionic surfactant.

Raman Spectroscopy of Carbon Nanotube Fibers Prepared with Different Concentrations of Polysorbate 20 as Nonionic Surfactant A Raman graph showing the crystallinity of carbon nanotube fibers is shown in FIG. 7.

As shown in FIG. 7, it was found that the Raman G/D ratio of carbon nanotubes containing a surfactant was higher than that of carbon nanotubes containing no surfactant. This indicates that the crystallinity of carbon nanotube fibers becomes superior. However, the G/D ratio was reduced when the amount of surfactant added was higher than a predetermined threshold value, which was caused by the presence of amorphous carbon due to excess surfactant.

EXPERIMENTAL EXAMPLE 5

Figure 8:
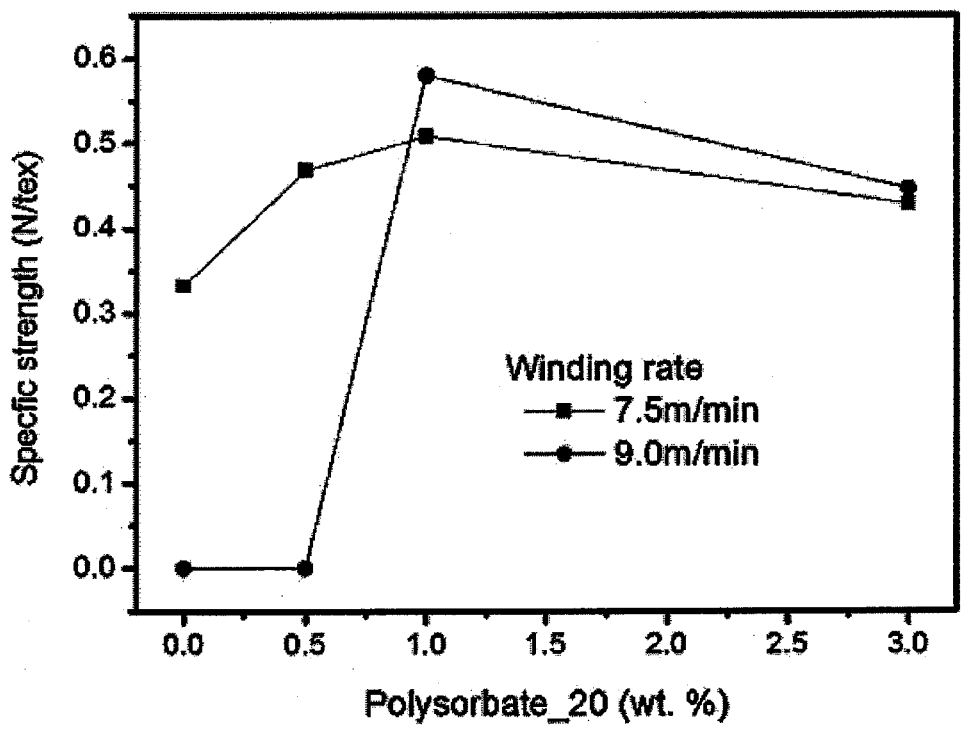
FIG. 8 is a graph showing the specific strength (N/tex) of carbon nanotube fibers prepared at different winding rates and different concentrations of polysorbate 20 as a nonionic surfactant.

Measurement of Specific Strength (N/Tex) of Carbon Nanotube Fibers Prepared at Different Winding Rates and Different Concentrations of Polysorbate 20 as Nonionic Surfactant The graph showing the specific strength (N/tex) of carbon nanotube fibers prepared at different winding rates and different concentrations of polysorbate 20 as a nonionic surfactant is shown in FIG. 8.

As shown in FIG. 8, it was found that the carbon nanotube fibers containing the nonionic surfactant in an amount of 1 wt % or more could be wound at a higher rate. The reason for this is that the physical properties of carbon nanotube fibers were improved. Under the conditions established in this Experimental Example, the spinning and winding at a rate of 9 m/min was impossible without the addition of the surfactant, but was possible with the solution containing the surfactant.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A method for preparing carbon nanotube fibers with improved spinning properties using a surfactant, the method comprising the steps of: (1) preparing a mixed solution by mixing a carbon source solution, a catalyst, a promoter, and 0.75 to 1.25 wt % polysorbate with respect to the total weight of the mixed solution; (2) forming a carbon nanotube agglomerate by injecting the mixed solution into an electric furnace at 500 to 1,500° C. together with a carrier gas; and (3) preparing carbon nanotube fibers by passing the carbon nanotube agglomerate through water to allow carbon nanotubes to be spun into fibers.

2. The method of claim 1, wherein the carbon source solution in step (1) comprises at least one selected from the group consisting of formaldehyde ($CH_2O$), acetaldehyde ($C_2H_4O$), methanol ($CH_3OH$)), ethanol ($C_2H_5OH$), diethylether (($C_2H_5)_2O$), polyethylene glycol (($CH_2$—$CH_2$—$O)_9$), 1-propanol ($CH_3CH_2CH_2OH$), acetone ($CH_3OCH_3$), ethyl formate ($CH_3CH_2COOH$), benzene ($C_6H_6$), mesitylene ($C_6H_3(CH_3)_3$), toluene ($C_7H_8$), xylene ($C_6H_4(CH_3)_2$), cumene ($C_9H_{12}$), ethylbenzene ($C_8H_{10}$), naphthalene ($C_{10}H_8$), methane ($CH_4$), ethane ($C_2H_6$), propane ($C_3H_8$), butane ($C_4H_{10}$), pentane ($C_5H_{12}$), hexane ($C_6H_{14}$), cyclohexane ($C_6H_{12}$), ethylene ($C_2H_4$), propylene ($C_3H_6$), and acetylene ($C_2H_2$).

3. The method of claim 1, wherein the catalyst in step (1) comprises at least one selected from the group consisting of copper (Cu), chromium (Cr), molybdenum (Mo), tungsten (W), iron (Fe), cobalt (Co), nickel (Ni), ruthenium (Ru), rhodium (Rh), palladium (Pd), osmium (Os), iridium (Ir), platinum (Pt), and ferrocene.

4. The method of claim 1, wherein the promoter in step (1) comprises thiophene ($C_4H_4S$) or carbon disulfide ($CS_2$).

5. The method of claim 1, wherein the polysorbate in step (1) comprises at least one selected from the group consisting of polysorbate 20, 40, 60, and 80.

6. The method of claim 1, wherein the mixed solution in step (1) is prepared by adding 0.01-20.00 wt % catalyst, 0.01-20.00 wt % promoter, and 0.75 to 1.25 wt % polysorbate with respect to the total weight of the mixed solution to the balance of a carbon source solution.

7. The method of claim 1, wherein the carrier gas in step (2) comprises hydrogen.

8. The method of claim 1, further comprising, after step (3), the step of allowing the carbon nanotube fibers to be twisted.

9. The method of claim 1, further comprising, after step (3), the step of densifying the carbon nanotube fibers by immersing the carbon nanotube fibers in an organic solvent and drying the resulting carbon nanotube fibers.

10. The method of claim 9, wherein the organic solvent comprises at least one selected from the group consisting of dimethyl sulfoxide, acetone, ethanol, chloroform, carbon dichloride, ethyl acetate, methanol, hexane, acetonitrile, toluene, benzene, carbon tetrachloride, pentane, polycaprolactone, tetrahydrofuran, and dimethyl formaldehyde.

11. The method of claim 9, further comprising the step of heat-treating the densified carbon nanotube fibers.

* * * * *